(12) United States Patent
Le Docte

(10) Patent No.: US 11,879,390 B2
(45) Date of Patent: Jan. 23, 2024

(54) DE-ICING DEVICE FOR AN AIR INTAKE OF AN AIRCRAFT TURBOJET ENGINE NACELLE

(71) Applicant: SAFRAN NACELLES, Gonfreville l'Orcher (FR)

(72) Inventor: Thierry Jacques Albert Le Docte, Moissy-Cramayel (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 95 days.

(21) Appl. No.: 17/432,853

(22) PCT Filed: Feb. 25, 2020

(86) PCT No.: PCT/EP2020/054866
§ 371 (c)(1),
(2) Date: Aug. 20, 2021

(87) PCT Pub. No.: WO2020/173921
PCT Pub. Date: Sep. 3, 2020

(65) Prior Publication Data
US 2022/0170418 A1 Jun. 2, 2022

(30) Foreign Application Priority Data
Feb. 27, 2019 (FR) ...................................... 1902012

(51) Int. Cl.
| *F02C 7/047* | (2006.01) |
| *B64C 7/02* | (2006.01) |
| *B64D 15/04* | (2006.01) |

(52) U.S. Cl.
CPC ............... *F02C 7/047* (2013.01); *B64C 7/02* (2013.01); *B64D 15/04* (2013.01);
(Continued)

(58) Field of Classification Search
CPC . F02C 7/047; B64C 7/02; B64D 15/04; F05D 2220/323; F05D 2250/25;
(Continued)

(56) References Cited

U.S. PATENT DOCUMENTS

| 6,241,189 B1 * | 6/2001 | Porte ....................... F02C 7/047 |
| | | 244/134 B |
| 8,061,657 B2 * | 11/2011 | Rocklin ................. B64D 15/04 |
| | | 138/116 |

(Continued)

FOREIGN PATENT DOCUMENTS

| CA | 2689195 A1 | 6/2010 |
| EP | 3199458 A1 | 8/2017 |
| FR | 2813581 A1 | 3/2002 |

OTHER PUBLICATIONS

Search Report from FR Intellectual Property Office on corresponding FR application (FR1902012) dated Jan. 8, 2020.

(Continued)

*Primary Examiner* — Steven M Sutherland
(74) *Attorney, Agent, or Firm* — KOS IP Law LLP

(57) ABSTRACT

The invention relates to a de-icing device for an air intake of an aircraft turbojet engine nacelle extending along an X-axis in which an air stream flows from upstream to downstream, the air intake having an inner cavity, extending annularly about the X-axis, which comprises an inner wall facing the X-axis and an outer wall which is opposite the inner wall, the walls being connected by a leading edge, the de-icing device comprising at least one injector for injecting a stream of hot air into the inner cavity, the injector comprising a nozzle extending along a nozzle axis, the nozzle being configured to inject a stream of hot air having a dissymmetry along the nozzle axis.

17 Claims, 6 Drawing Sheets

(52) U.S. Cl.
    CPC .... *F05D 2220/323* (2013.01); *F05D 2250/25* (2013.01); *F05D 2250/323* (2013.01); *F05D 2250/73* (2013.01); *F05D 2260/2212* (2013.01)

(58) Field of Classification Search
    CPC ........... F05D 2250/323; F05D 2250/73; F05D 2260/2212
    See application file for complete search history.

(56) References Cited

U.S. PATENT DOCUMENTS

| | | | |
|---|---|---|---|
| 10,138,811 B2 * | 11/2018 | Gally | F02C 7/047 |
| 2002/0027180 A1 * | 3/2002 | Porte | B64D 15/04 244/134 R |
| 2018/0194485 A1 | 7/2018 | Chilukuri | |

OTHER PUBLICATIONS

International Search Report and Written Opinion on related PCT application (PCT/EP2020/054866) from International Searching Authority (EPO) dated May 20, 2020.

* cited by examiner

DE-ICING DEVICE FOR AN AIR INTAKE OF AN AIRCRAFT TURBOJET ENGINE NACELLE

TECHNICAL FIELD

The present invention relates to the field of aircraft turbojet engines and is more particularly directed to a deicing device for an air intake of an aircraft turbojet engine nacelle.

BACKGROUND

In a known manner, an aircraft comprises one or more turbojet engines to allow its propulsion by acceleration of an air stream which circulates from upstream to downstream in the turbojet engine.

With reference to FIG. 1, a turbojet engine 100 extending along an axis X and comprising a fan 101 rotatably mounted about axis X in a nacelle comprising an external shell 102 in order to accelerate an air stream F from upstream to downstream is represented. Hereinafter, the terms upstream and downstream are defined with respect to the circulation of air stream F. The turbojet engine 100 comprises at its upstream end an air intake 200 comprising a cavity 204, annularly extending about axis X, which comprises an internal wall 201 facing axis X and an external wall 202 which is opposite to the internal wall 201, the walls 201, 202 are connected by a leading edge 203 also called an "air intake lip". Thus, the air intake 200 allows the incoming air stream F to be separated into an internal air stream FINT guided by the internal wall 201 and an external air stream FEXT guided by the external wall 202. Hereinafter, the terms internal and external are defined radially with respect to axis X of the turbojet engine 100.

In a known way, during a flight of an aircraft, due to the temperature and pressure conditions, ice is likely to accumulate at the leading edge 203 and the internal wall 201 of the air intake 200 and to form blocks of ice which are likely to be ingested by the turbojet engine 100. Such ingestions have to be avoided in order to improve the life time of the turbojet engine 100 and to reduce malfunctions.

In order to eliminate the accumulation of ice, still referring to FIG. 1, it is known to circulate a hot air stream FAC in the internal cavity 204 in order to heat the internal wall 201 by thermal convection and thus avoid accumulation of ice which melts as it accumulates.

The introduction of the hot air stream FAC into the internal cavity 204 is carried out by an injector 300 which is conventionally in the form of a tube with a cylindrical cross-section which is oriented in a direction tangential to the axis of the turbojet engine as illustrated in FIG. 2. The hot air stream FAC moves circumferentially through the internal cavity 204 in order to heat the internal wall 201.

In practice, the energy efficiency of such heating is low as the hot air stream FAC also heats the external wall 202, which represents a heat loss. In fact, with reference to FIG. 3, when the hot air stream FAC is injected, it comes directly into contact with the external wall 202, which captures a large part of the heat from the hot air stream FAC as it is guided into the internal cavity 204. Therefore, to allow optimal heating of the internal wall 201, it is necessary to inject a superheated air stream FAC into the internal cavity 204. An immediate solution to eliminate this drawback would be to change the orientation of the injector 300 in the internal cavity 204 in order to target the internal wall 201. However, such an immediate solution does not provide uniform heating of a circumferential external wall 202. In the best case, this solution results in a displacement of the contact zone of the hot air stream FAC with the external wall 202, which thus remains present.

One of the purposes of the present invention is to enable heating of the internal wall 201 of the air intake 200 of a turbojet engine nacelle with improved energy efficiency.

Incidentally, a twisted hot air stream injector is known from patent application CA2689195. From patent application FR2813581, there is known an injector for a twisted hot air stream and an axial hot air stream in a concentric manner in order to form a hot air stream having symmetry along the axis of the injector mouthpiece in order to heat indifferently the walls of the internal cavity.

SUMMARY

The invention relates to a deicing device for an air intake of an aircraft turbojet engine nacelle extending along an axis X in which an air stream circulates from upstream to downstream, the air intake comprising an internal cavity annularly extending about axis X, which has an internal wall facing axis X and an external wall which is opposite to the internal wall, the walls being connected by a leading edge, the deicing device comprising at least one injector of a hot air stream into the internal cavity, the injector comprising a mouthpiece extending along a mouthpiece axis.

The invention is remarkable in that the mouthpiece is configured to inject a hot air stream having an asymmetry along the mouthpiece axis so as to generate turbulence in the vicinity of the external wall while heating the internal wall. In other words, the hot air stream has not a symmetry of revolution about the mouthpiece axis. This advantageously makes it possible to heat the internal wall and the external wall of the internal cavity differently in order to maximise heat exchange with the internal wall and minimise it with the external wall. Thus, heating of the internal wall is optimal.

Preferably, the mouthpiece comprises at least one first channel configured to lead a first elementary stream and at least one second channel configured to lead a second elementary stream so as to form the hot air stream. The channels are superimposed, that is not concentric with each other. By virtue of the invention, the mouthpiece makes it possible to form a first elementary stream dedicated to the external wall and a second elementary stream dedicated to the internal wall so as to allow differentiated heating. Advantageously, the pressure differential creates, in the zone of mixing the elementary streams FE1, FE2, a deflection of the hot air stream FAC by the Coanda effect.

Preferably, the first channel comprises at least one air deflection member. Preferably, the air deflection member is configured to twist the first elementary stream. According to a preferred aspect, the air deflection member has a helical shape. Thus, the twisted first elementary stream allows to generate turbulence which allow, on the one hand, to limit heat exchanges with the external wall of the cavity and, on the other hand, to carry out a twisting of the first elementary stream in order to promote circumferential circulation in the annular internal cavity.

Preferably, the second channel is devoid of an air deflection member so as to provide a second elementary stream substantially axial.

According to a preferred aspect, the mouthpiece comprises a separating member to separate the mouthpiece between the first channel and the second channel. In other words, the mouthpiece consists of two channels. Preferably, the separating member is in the form of a substantially flat wall, preferably parallel to the mouthpiece axis. Thus, the elementary streams are guided independently in the mouthpiece so as to allow two different guide ways. According to a preferred aspect, the mouthpiece comprises only two channels.

Preferably, the first channel is convergent from upstream to downstream in order to accelerate the first elementary stream. Preferably, the second channel is convergent from upstream to downstream in order to accelerate the second elementary stream.

The invention also relates to an air intake of an aircraft turbojet engine nacelle extending along an axis X in which an air stream circulates from upstream to downstream, the air intake comprising an internal cavity, annularly extending about axis X which comprises an internal wall facing axis X and an external wall which is opposite to the internal wall, the walls being connected by a leading edge, the air intake comprising a deicing device, as previously set forth, in which the first elementary stream is configured to be injected on the side of the external wall of the internal cavity. Preferably, the second elementary stream is configured to be injected on the side of the internal wall of the internal cavity.

Preferably, the first elemental stream is radially external to the second elemental stream.

The invention also relates to a method for using a deicing device as set forth above for deicing an air intake of an aircraft turbojet engine nacelle extending along an axis X in which an air stream circulates from upstream to downstream, the air intake comprising an internal cavity, annularly extending about axis X, which comprises an internal wall facing the X axis and an external wall which is opposite to the internal wall, the walls being connected by a leading edge, the method comprising a step of injecting a hot air stream having an asymmetry along the mouthpiece axis so as to generate turbulence in the vicinity of the external wall while heating the internal wall.

BRIEF DESCRIPTION OF THE DRAWINGS

The invention will be better understood upon reading the following description, which is given solely by way of example, and refers to the appended drawings given as non-limiting examples, in which identical references are given to similar objects and in which.

It should be noted that the figures set out the invention in detail for implementing the invention, said figures of course being capable of serving to better define the invention where appropriate.

DETAILED DESCRIPTION

Figure 1:
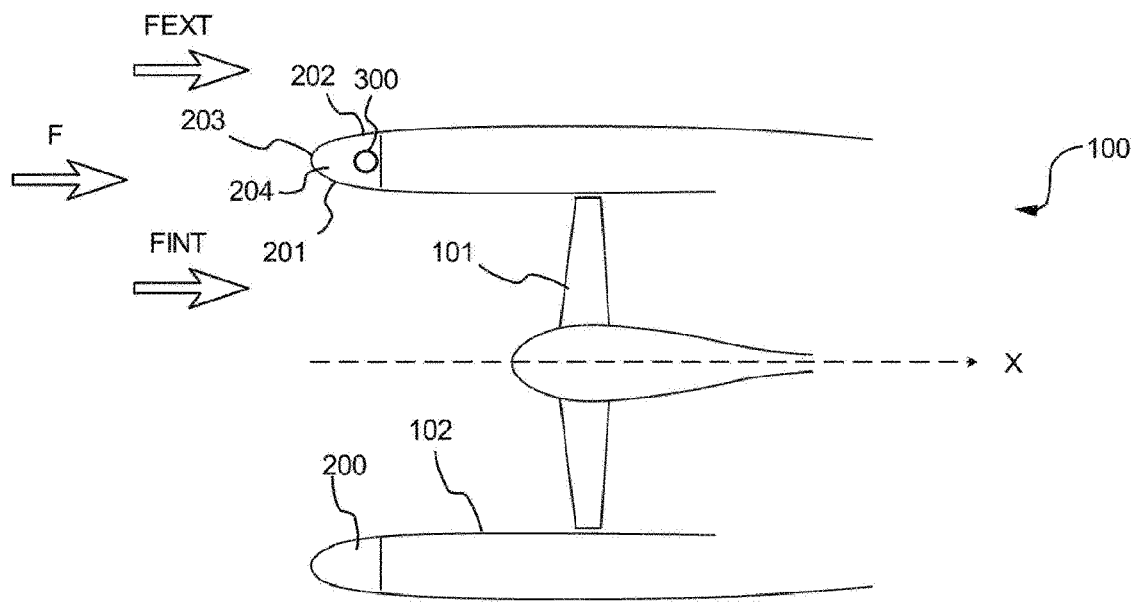
FIG. 1 is a schematic representation of an air intake of a nacelle according to prior art.
Figure 2:
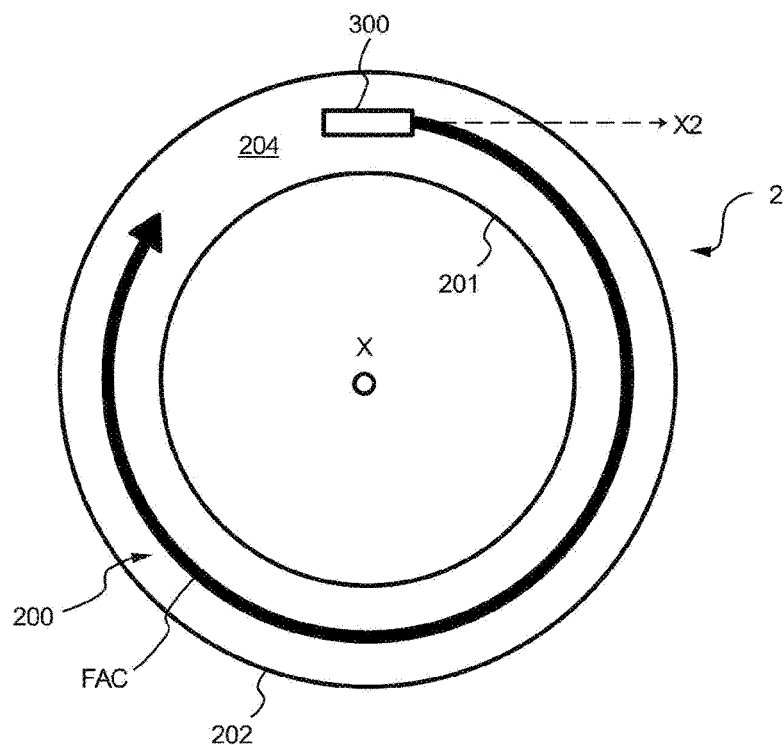
FIG. 2 is a schematic transverse cross-section representation of the theoretical circulation of a hot air stream through the air intake.
Figure 3:
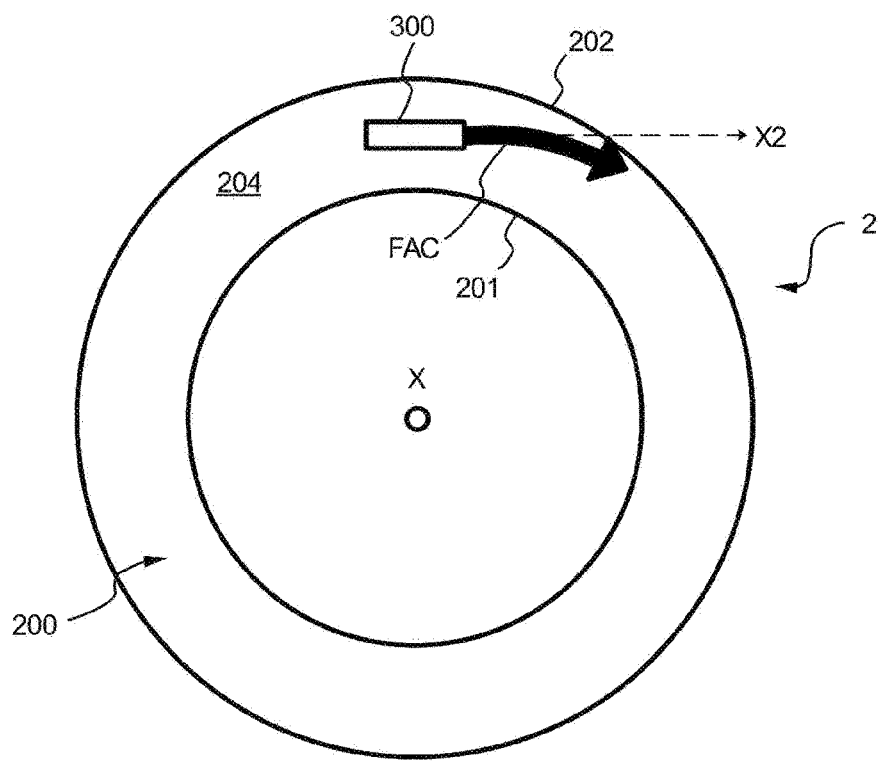
FIG. 3 is a schematic transverse cross-section representation of the actual circulation of a hot air stream through the air intake.
Figure 4:
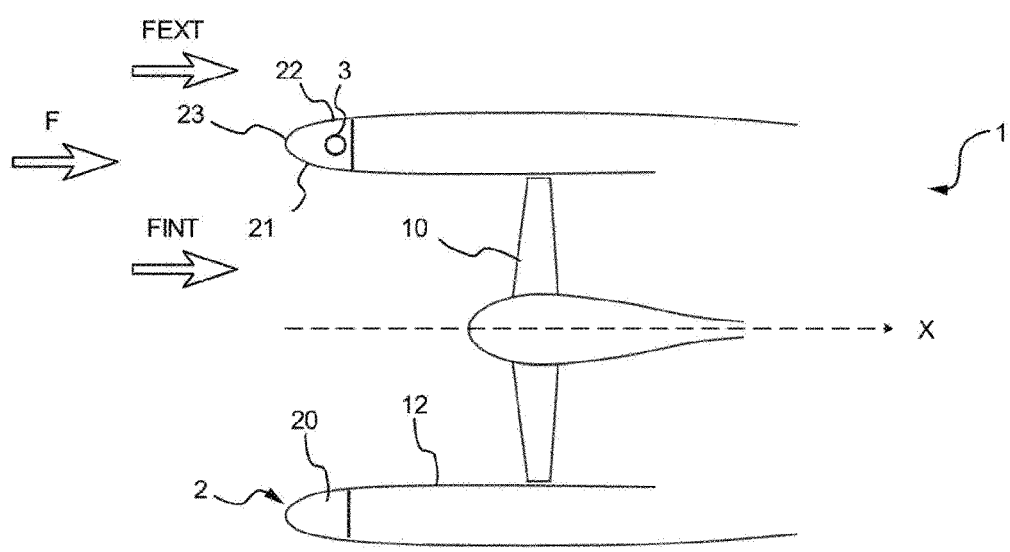
FIG. 4 is a schematic representation of an air intake of a nacelle according to the invention.

With reference to FIG. 4, there is represented a turbojet engine 1 extending along an axis X and comprising a fan 10 rotatably mounted about axis X in a nacelle comprising an external shell 12 in order to accelerate an air stream F from upstream to downstream. Hereinafter, the terms upstream and downstream are defined in relation to the circulation of the air stream F. The turbojet engine 1 comprises at its upstream end an air intake 2 which comprises an internal cavity 20, annularly extending about axis X, which has an internal wall 21 facing axis X and an external wall 22 which is opposite to the internal wall 21. The walls 21, 22 are connected by a leading edge 23, also known as the "air intake lip". Thus, the air intake 2 allows the incoming air stream F to be separated into an internal air stream FINT guided by the internal wall 21 and an external air stream FEXT guided by the external wall 22. Hereafter, the terms internal and external are defined radially with respect to axis X of the turbojet engine 1.

The turbojet engine 1 comprises a deicing device to eliminate ice accumulation. In a known manner, the deicing device comprises an injector 3 of a hot air stream FAC into the internal cavity 20. Such circulation of a hot air stream FAC makes it possible, by thermal convection, to heat the internal wall 21 and thus avoid accumulation of ice which melts as it accumulates.

Figure 5:
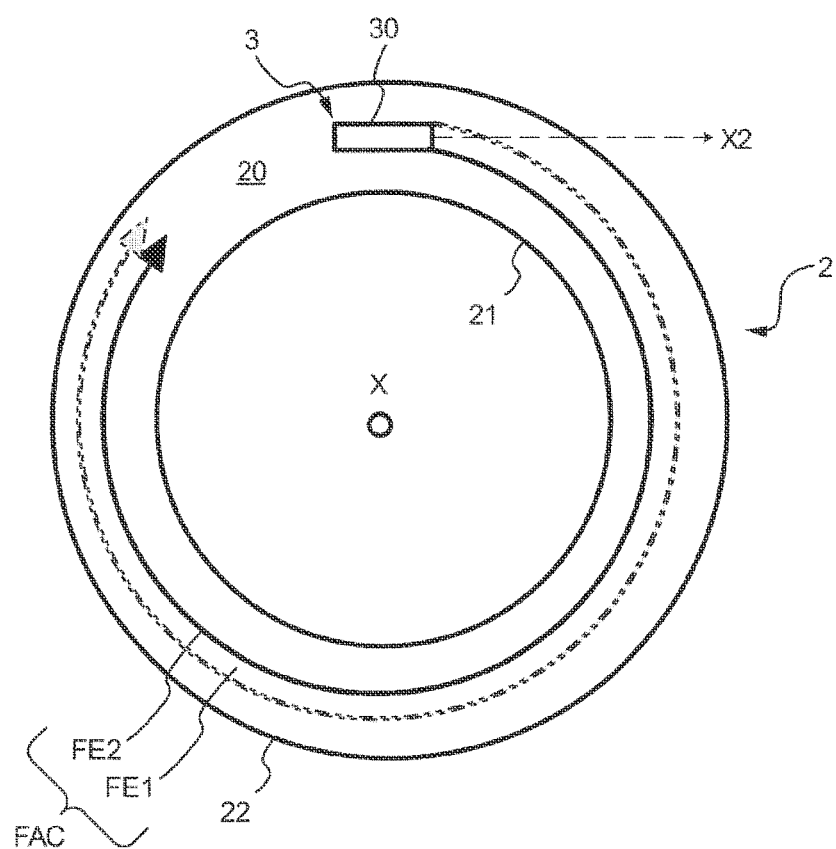
FIG. 5 is a schematic representation of the circulation of a hot air stream through the air intake according to one embodiment of the invention.

With reference to FIG. 5, the injector 3 comprises a mouthpiece 30 extending along a mouthpiece axis X2 so as to allow circumferential injection into the internal cavity 20 of the air intake 2. Preferably, the mouthpiece axis X2 is tangential to axis X of the turbojet engine. According to the invention, the mouthpiece 30 is configured to inject a hot air stream FAC having an asymmetry along the mouthpiece axis X2. In other words, the hot air stream FAC has not a symmetry of revolution about the mouthpiece axis X2.

Figure 6:
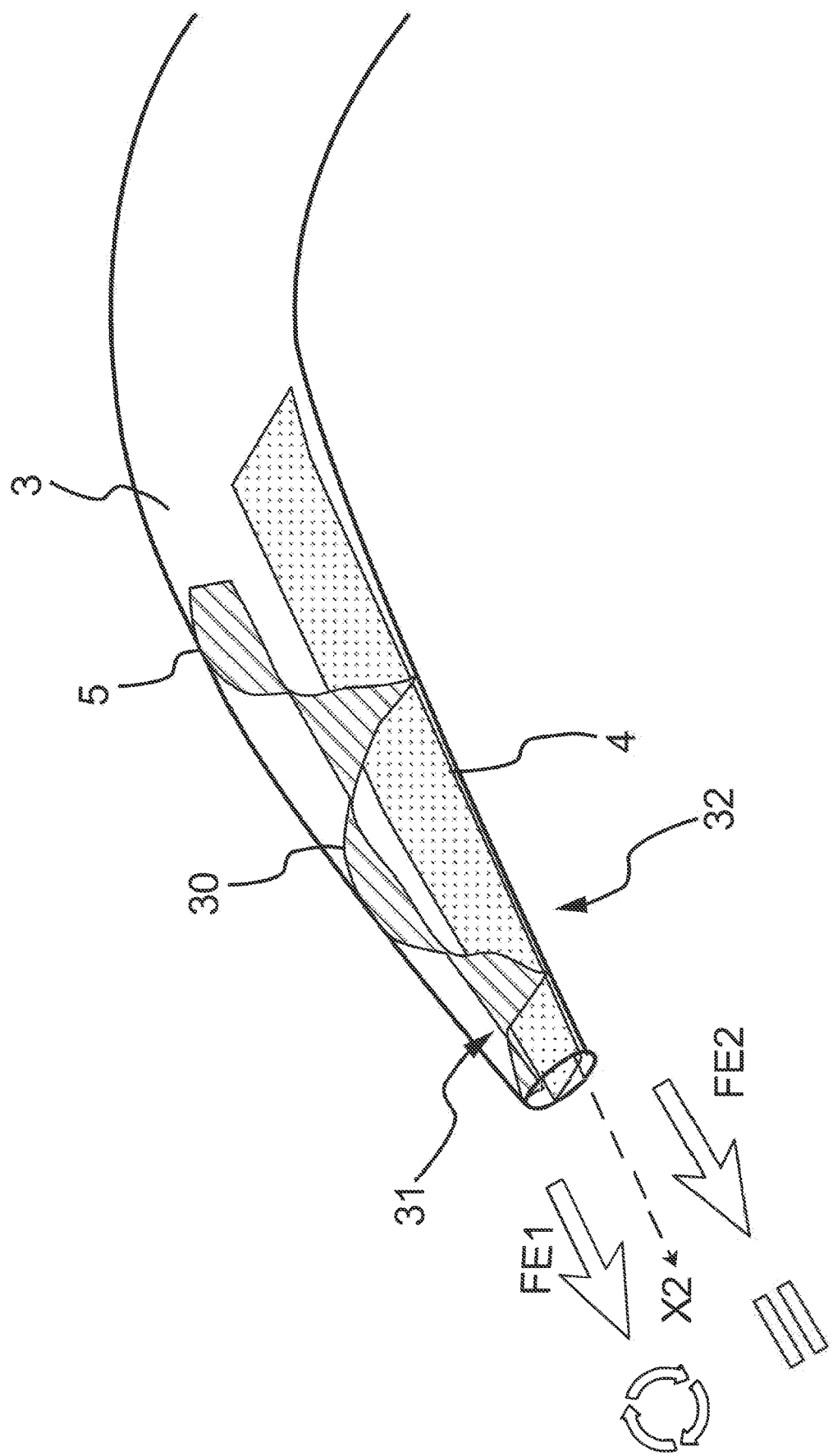
FIG. 6 is a schematic representation of a mouthpiece of an injector of a deicing device according to the invention.
Figure 7:
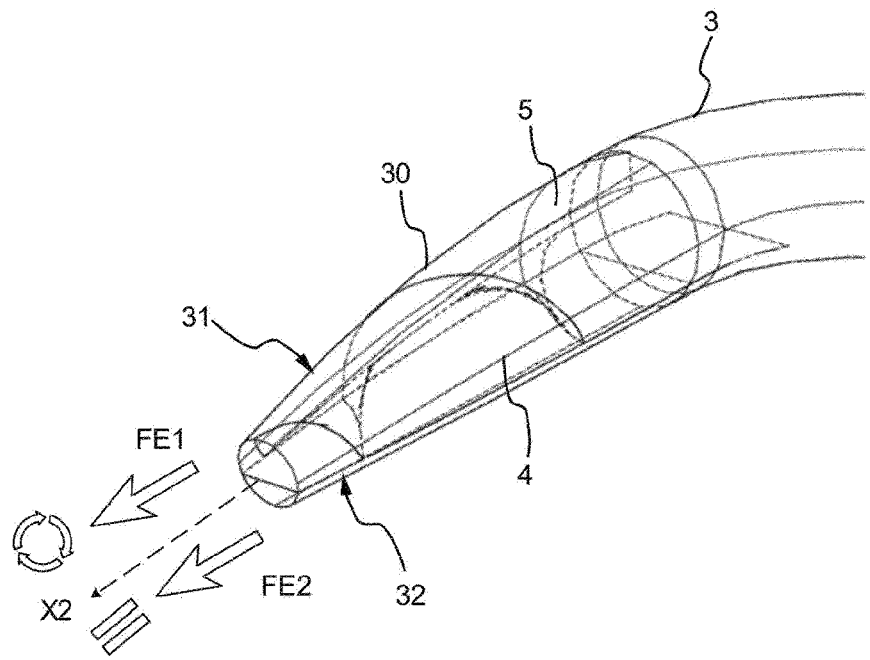
FIG. 7 is a schematic cutaway representation of a mouthpiece of an injector of a deicing device according to the invention.

In this example, with reference to FIGS. 6 and 7, the mouthpiece 30 comprises a first channel 31 configured to lead a first elementary stream FE1 and a second channel 32 configured to lead a second elementary stream FE2 so as to form the hot air stream FAC. In other words, the hot air stream FAC comprises the first elementary stream FE1 and the second elementary stream FE2. Preferably, the mouthpiece 30 comprises only two channels 31, 32 in order to allow optimal deicing, but it goes without saying that the number of channels could be higher. The first elementary stream FE1 and the second elementary stream FE2 are different. In this example, the first elementary stream FE1 is twisted about the mouthpiece axis X2 while the second elementary stream FE2 circulates parallel to the mouthpiece axis X2 so as to form together an overall stream having an asymmetry along the mouthpiece axis X2.

In this example, the cross-section of the first channel 31, along the mouthpiece axis X2, is larger than the cross-section of the second channel 32. This advantageously allows the first elementary stream FE1 to be twisted in an optimal manner, as will be set forth later.

The first channel 31 is convergent from upstream to downstream so as to accelerate the first elementary stream FE1. In other words, the cross-section area of the first channel 31 narrows from upstream to downstream, its inlet cross-section area being greater than its outlet cross-section area.

According to one aspect of the invention, the second channel 32 is convergent from upstream to downstream so as to accelerate the second elementary stream FE2. In other words, the transverse cross-section area of the second channel 32 narrows from upstream to downstream, its inlet cross-section area being greater than its outlet cross-section area.

The convergence rate of a channel 31, 32, that is the ratio of their inlet cross-section area to their outlet cross-section area, is equal or different between both channels 31, 32.

As illustrated in FIGS. 6 and 7, the mouthpiece 30 comprises a separating member 4 and an air deflecting member 5. Preferably, the separating member 4 is in the form of a substantially planar wall in order to separate the mouthpiece 30 into two channels 31, 32. Of course, the separating member 4 could be of a different shape, especially a concave or convex shape.

Preferably, the separating member 4 extends parallel to the mouthpiece axis X2 in order to allow differentiated guidance in the channels 31, 32. In this example, the first channel 31 comprises a single air deflection member 5. But it goes without saying that it could comprise several of them, in series or in parallel. Preferably, the length of the partition wall 4 is adapted to the length of the air deflection member 5.

Figure 8:
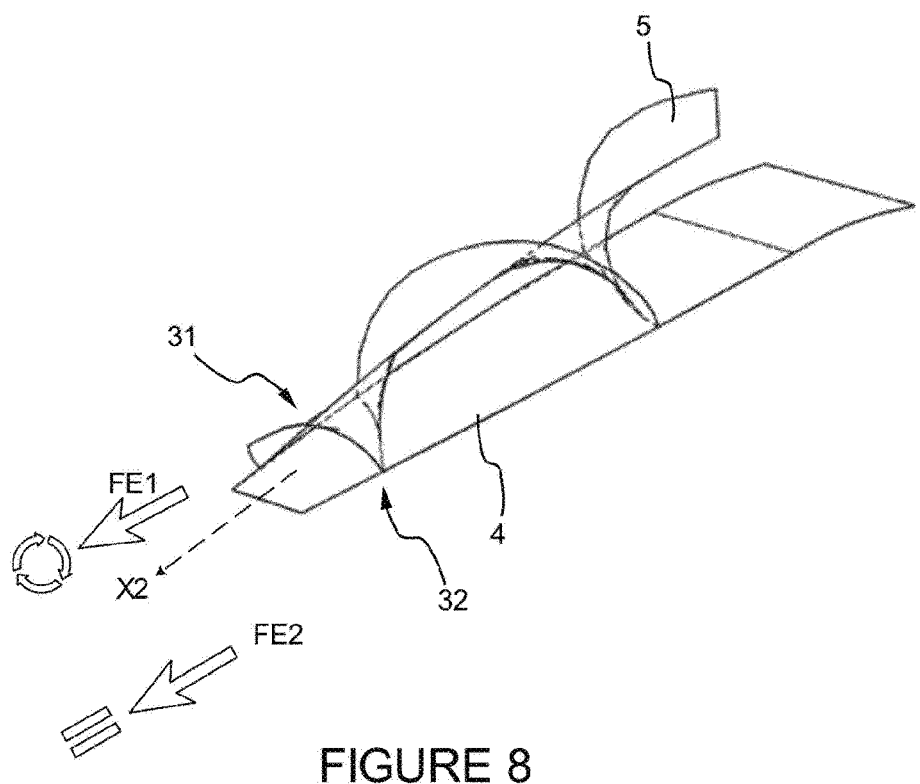
FIG. 8 is a schematic perspective representation of a partition wall and an air deflection member.
Figure 9:
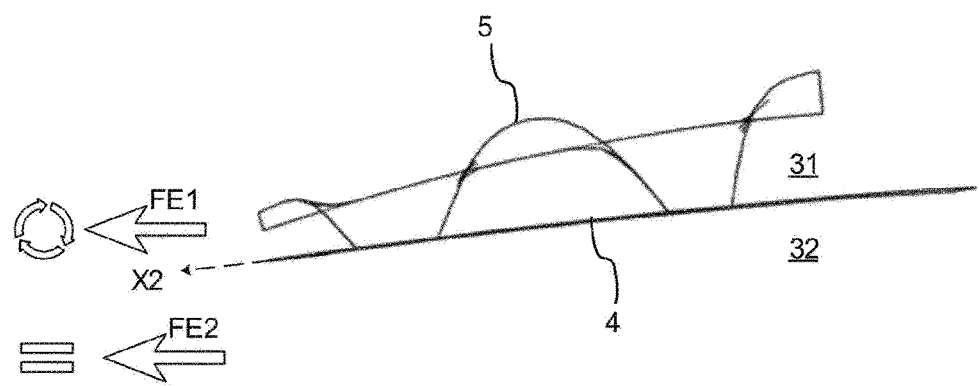
FIG. 9 is a schematic side representation of the partition wall and the air deflection member.

In this example, the air deflection member 5 is configured to twist the first elementary stream FE1. For this purpose, the air deflection member 5 has a helical shape providing three twists as illustrated in FIGS. 8 and 9. Preferably, the number of twists is between 2 and 5 in order to twist the first elementary stream FE1 in an optimal way. Preferably, the first channel 31 has a decreasing cross-section up to its outlet so as to allow the first elementary stream FE1 to be twisted and accelerated, thereby increasing turbulence in the internal cavity 20 and avoiding frontal impact on the external wall 22. Furthermore, such an air deflection member 5 allows circumferential circulation in the air intake 2 to be promoted in a natural way since the first elementary stream FE1 is ejected in a twisted manner. Also unlike prior art which allowed circumferential guidance of the hot air stream FAC only by the external wall 22 of the internal cavity 20, which generated, as a reminder, heat losses, the present invention also allows circumferential guidance due to the twisting of the hot air stream FAC, which limits heat losses. The second channel 32 is devoid of air deflection member so that the elementary streams FE1, FE2 are injected with different angles (axial trajection/helical trajection) and at different speeds.

The two elementary streams FE1, FE2 are ejected in a superimposed manner. The pressure differential creates, in the zone of mixing the elementary streams FE1, FE2, a deflection of the hot air stream FAC by the Coanda effect. The position, angle, flowrate ratio and relative velocities of the two elementary streams FE1, FE2 are determined in such a way as to allow for an optimal deflection, that is one that follows the annular shape of the internal cavity 20. Preferably, in order to control deflection, the injector 3 comprises a static or dynamic device, for regulating head losses.

With reference to FIG. 5, the first elementary stream FE1 is configured to be injected on the side of the external wall 22 of the internal cavity 20 while the second elementary stream FE2 is configured to be injected on the side of the internal wall 21 of the internal cavity 20. In other words, the first channel 31 is radially internal to the second channel 32.

As will be set forth in the exemplary implementation of the invention, the use of such a deicing device makes it possible to optimize heating of the internal wall 21 of the internal cavity 20 while limiting heat losses.

Alternatively, the second channel 32 is radially external and the first channel 31 is radially internal depending on the supply pressures of the channels 31, 32.

The method comprises a step of injecting into the internal cavity 20 by the injector 3 an overall hot air stream FAC having an asymmetry along the mouthpiece axis X2. In this example, the first, radially external channel 31 injects a first elementary stream FE1 which is twisted and which allows a torsion to be carried out to the overall hot air stream FAC, which limits contacts with the external wall 22. Furthermore, the first elementary stream FE1 generates turbulence in the vicinity of the external wall 22 which limits circulation velocity in the vicinity of the external wall 22 which thus captures a limited heat quantity. In other words, heat exchange between the external wall 22 and the first elementary stream FE1 of the hot air stream FAC is significantly reduced.

Conversely, the second, radially internal channel 32 injects a second elementary stream FE2 which is axial. This makes it possible to bring a large heat quantity to the internal wall 21 to heat it so that it remains dry. Advantageously, the first elementary stream FE1 allows circumferential circulation of the second elementary stream FE2 to be guided without taking heat therefrom, which is advantageous. The asymmetry of the hot air stream FAC advantageously allows the internal wall 21 and the external wall 22 to be heated differently. By virtue of the invention, the deicing of an air intake 2 is improved in a practical way by modifying the mouthpiece 30 of the injector 3. In practice, an efficiency of more than 75% is obtained, which is higher than commercially available deicing devices which do not exceed 70%.

Subsequently to the injection, after a circulation of the hot air stream FAC over a length of the order of 15 times the overall diameter of the mouthpiece 30 of the injector 3 in the internal cavity 20, the entire volume of air in the internal cavity 20 is displaced to heat the air intake lip by convection. Advantageously, due to the initial asymmetry, the transverse temperature of the air volume is homogeneous, allowing for optimal heat exchange.

The invention claimed is:

1. A deicing device for an air intake of a nacelle of an aircraft turbojet engine extending along an axis X in which an air stream circulates from upstream to downstream, the air intake comprising an internal cavity annularly extending about the axis X, which comprises an internal wall facing the axis X and an external wall, which is opposite to the internal wall, the internal and external walls being connected by a leading edge, the deicing device comprising:

at least one injector for injecting a hot air stream into the internal cavity, the at least one injector comprising a mouthpiece extending along a mouthpiece axis;

wherein the mouthpiece comprises a housing having a separating member located therein to separate the mouthpiece between a first channel and a second channel, the first channel configured to lead a first elementary stream and the second channel configured to lead a second elementary stream and the first and the second elementary streams combine to form the hot air stream;

the mouthpiece being configured to eject the first elementary stream and the second elementary stream in a superimposed manner so that the hot air stream flows asymmetrically along the mouthpiece axis so as to generate turbulence in a vicinity of the external wall while heating the internal wall; and wherein an air deflection member is located in the first channel.

2. The deicing device according to claim 1, wherein the air deflection member is configured to twist the first elementary stream.

3. The deicing device according to claim 1, wherein the air deflection member located in the first channel has a helical shape.

4. The deicing device according to claim 1, wherein the first channel is convergent from upstream to downstream.

5. An air intake of a nacelle of an aircraft turbojet engine extending along an axis X in which an air stream circulates from upstream to downstream, the air intake comprising an internal cavity, annularly extending about the axis X, which comprises an internal wall facing the axis X and an external wall which is opposite to the internal wall, the internal and external walls being connected by a leading edge, the air intake comprising the deicing device according to claim 1, wherein the first elementary stream is configured to exit the mouthpiece to flow on a side of the external wall of the internal cavity.

6. The air intake according to claim 5, wherein the second elementary stream is configured to exit the mouthpiece to flow on a side of the internal wall of the internal cavity.

7. A method for using the deicing device according to claim 1 for deicing an air intake of a nacelle of an aircraft turbojet engine extending along an axis X in which an air stream circulates from upstream to downstream, the method comprising: injecting a hot air stream having an asymmetry along the mouthpiece axis so as to generate turbulence in a vicinity of the external wall while heating the internal wall.

8. A deicing device for an air intake of a nacelle of an aircraft turbojet engine extending along an axis X in which an air stream circulates from upstream to downstream, the air intake comprising an internal cavity annularly extending about the axis X, which comprises an internal wall facing the axis X and an external wall, which is opposite to the internal wall, the internal and external walls being connected by a leading edge, the deicing device comprising:

an injector comprising a mouthpiece extending along a mouthpiece axis, the mouthpiece comprising a housing having an upstream end and a downstream end having an outlet for directing air from the upstream end to the downstream end and out the outlet, a separating wall located inside the housing and extending along a length of the housing to define a first channel and a second channel within the housing, and a deflection member located only in the first channel; and wherein the mouthpiece is configured to eject a first elementary stream in the first channel and a second elementary stream in the second channel in a superimposed manner so that the first and second elementary streams flow asymmetrically along the mouthpiece axis.

9. The deicing device according to claim 8, wherein the deflection member has a helical shape having at least two twists.

10. The deicing device according to claim 8, wherein the housing of the mouthpiece is oriented so that the first channel is closer to an external wall than an internal wall of an air intake of a nacelle of an aircraft turbojet engine when the deicing device is positioned in an internal cavity of the air intake of the nacelle.

11. The deicing device according to claim 8, wherein the deflection member is both twisted and convergent from the upstream end to the downstream end such that the deflection member is smaller at the downstream end than the upstream end.

12. The deicing device according to claim 8, wherein the separating wall is convergent from the upstream end to the downstream end such that the separating wall is smaller at the downstream end than the upstream end.

13. The deicing device according to claim 12, wherein the separating wall is a substantially planar wall.

14. A deicing device for an air intake of a nacelle of an aircraft turbojet engine extending along an axis X in which an air stream circulates from upstream to downstream, the deicing device comprising:

an injector comprising a mouthpiece extending along a mouthpiece axis, the mouthpiece comprising a housing having an upstream end and a downstream end having an outlet for directing air from the upstream end to the downstream end and out the outlet, a separating wall located inside the housing and extending along a length of the housing to define a first channel and a second channel within the housing, and a deflection member located within the housing;

wherein the separating wall is convergent from the upstream end to the downstream end such that the separating wall is smaller at the downstream end than the upstream end; and wherein the mouthpiece is configured to eject a first elementary stream in the first channel and a second elementary stream in the second channel in a superimposed manner so that the first and second elementary streams flow asymmetrically along the mouthpiece axis.

15. The deicing device according to claim 14, wherein the deflection member is located only in the first channel.

16. The deicing device according to claim 15, wherein the deflection member is twisted.

17. The deicing device according to claim 16, wherein the deflection member is convergent from the upstream end to the downstream end such that the deflection member is smaller at the downstream end than the upstream end.

* * * * *